United States Patent
Berry

(10) Patent No.: US 6,947,970 B2
(45) Date of Patent: Sep. 20, 2005

(54) METHOD AND APPARATUS FOR MULTILEVEL TRANSLATION AND PROTECTION TABLE

(75) Inventor: Frank L. Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 1037 days.

(21) Appl. No.: 09/739,233

(22) Filed: Dec. 19, 2000

(65) Prior Publication Data

US 2002/0078271 A1 Jun. 20, 2002

(51) Int. Cl.$^7$ .............................. G06F 15/167
(52) U.S. Cl. ...................... 709/212; 709/216
(58) Field of Search ............... 709/212–216; 712/29; 710/22; 711/153, 147, 173, 203

(56) References Cited

U.S. PATENT DOCUMENTS

| | | | | |
|---|---|---|---|---|
| 5,255,384 A | * | 10/1993 | Sachs et al. | 711/207 |
| 5,475,827 A | * | 12/1995 | Lee et al. | 711/207 |
| 6,085,296 A | * | 7/2000 | Karkhanis et al. | 711/206 |
| 6,163,834 A | * | 12/2000 | Garcia et al. | 711/206 |
| 6,345,347 B1 | * | 2/2002 | Biran | 711/163 |
| 6,393,544 B1 | * | 5/2002 | Bryg et al. | 711/220 |
| 6,487,628 B1 | * | 11/2002 | Duong et al. | 710/313 |
| 6,915,088 | * | 7/2005 | Nakagawa et al. | 1/1 |
| 2003/0018876 A1 | * | 1/2003 | Zahir et al. | 711/206 |
| 2004/0015622 A1 | * | 1/2004 | Avery | 710/22 |

FOREIGN PATENT DOCUMENTS

WO 9935579 7/1999

OTHER PUBLICATIONS von Eicken et al., Evolution Of The Virtual Interface Architecture, 0018–9152/98/$10.00 © 1998 IEEE, pp. 61–68, Nov. 1998.

Dunning et al., The Virtual Interface Architecture, 0272–1732/98/$10.00 © 1998 IEEE, pp. 66–76, Mar./Apr. 1998.

Banikazemi, et al.,Comparison and Evaluation of Design Choices for Implementing the Virtual Interface Architecture (VIA), B. Falsafi and M. Lauria (Eds.): CANPC 2000, LNCS 1797, pp. 145–161, 2000, © Springer–Verlag Berlin Heidelberg 2000.

* cited by examiner

Primary Examiner—Frantz B. Jean
(74) Attorney, Agent, or Firm—Libby H. Hope

(57) ABSTRACT

A host is provided that includes a processor, a host memory coupled to the processor, and a host-fabric adapter coupled to the processor and provided to interface with a switched fabric including one or more fabric-attached I/O controllers. The host-fabric adapter may include logic for accessing a translation and protection table from the host memory for a data transaction. The translation and protection table may include a plurality of translation entries and at least one region entry. The at least one region entry may include multiple levels of translation entries.

30 Claims, 7 Drawing Sheets

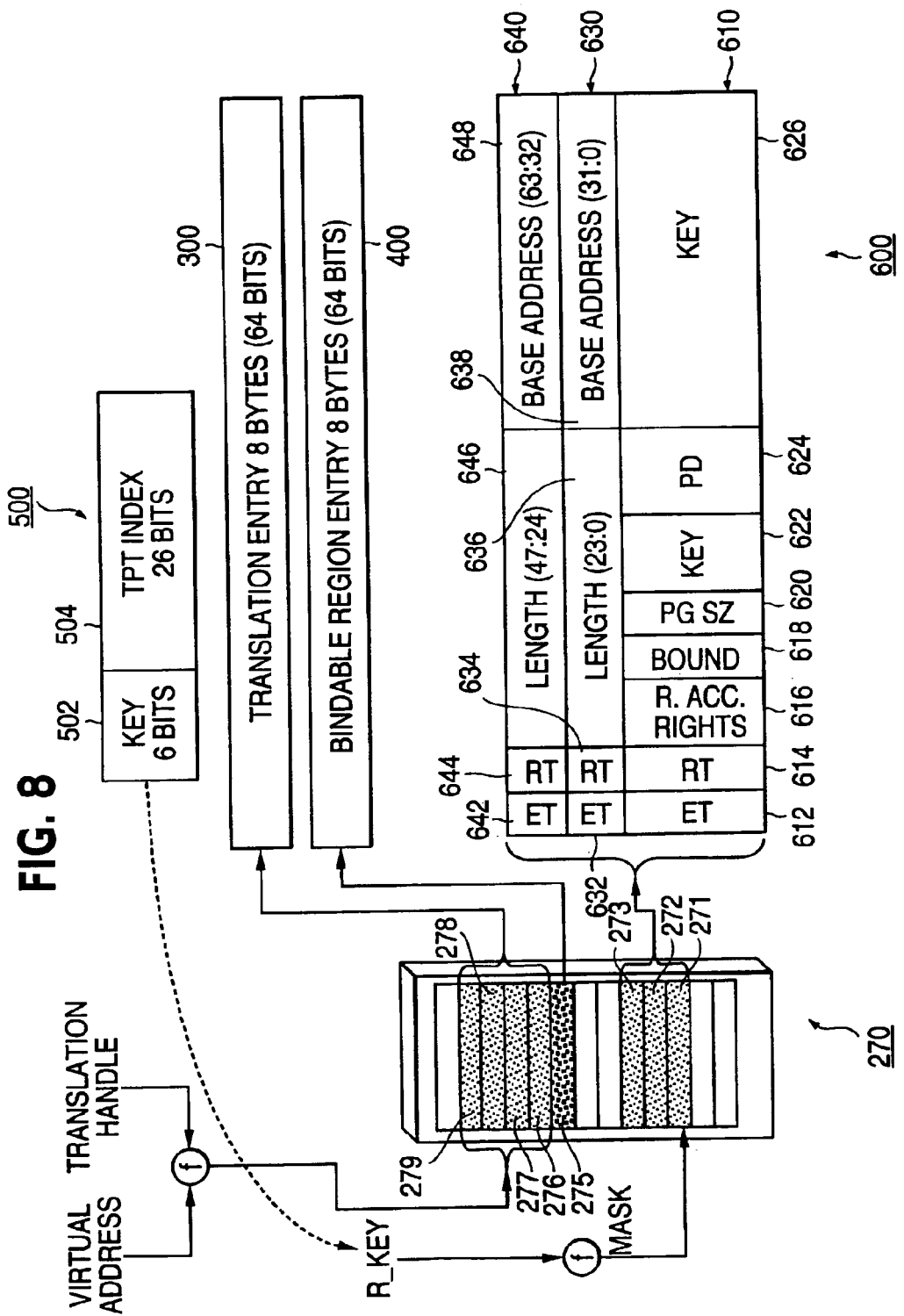

METHOD AND APPARATUS FOR
MULTILEVEL TRANSLATION AND
PROTECTION TABLE

TECHNICAL FIELD

The present invention relates to a data network, and more particularly relates to the arrangement and use of translation entries of a translation and protection table (TPT).

BACKGROUND

In network architectures, an operating system (OS) may virtualize network hardware into a set of logical communication endpoints and multiplex access to the hardware among these endpoints (e.g., computers, servers and/or I/O devices). The operating system (OS) may also implement protocols that make communication between connected endpoints reliable (e.g., transmission control protocol, TCP).

The operating system (OS) may receive a request to send a message (data) and a virtual address that specifies the location of the data associated with the message, copy the message into a message buffer and translate the virtual address. The OS may then schedule a memory copy operation to copy data from the message buffer memory to a target device. A translation and protection table (TPT) may be used to translate the virtual address, received in the form of descriptors or work queues, into physical addresses and to define memory regions before a host network adapter can access them (e.g., for transfer to/from a remote device) during data transfer (movement) operations. There is a need for a more efficient technique of using and accessing the translation and protection table (TPT) to perform virtual-to-physical address translations while providing additional memory access protection during data transfer operations.

BRIEF DESCRIPTION OF THE DRAWINGS

A more complete appreciation of example embodiments of the present invention and many of the attendant advantages of the present invention will become readily apparent as the same becomes better understood by reference to the following detailed description when considered in conjunction with the accompanying drawings in which like reference symbols indicate the same or similar components, and wherein:

FIG. 8 illustrates a translation and protection table as well as translation entries, a region entry and a window region entry according to an example embodiment of the present invention.

DETAILED DESCRIPTION

The present invention may be applicable for use with all types of data networks and clusters designed to link together computers, servers, peripherals, storage devices, and communication devices for communications. Examples of such data networks may include a local area network (LAN), a wide area network (WAN), a campus area network (CAN), a metropolitan area network (MAN), a global area network (GAN), a storage area network and a system area network (SAN), including newly developed data networks using Next Generation I/O (NGIO), Future I/O (FIO), Infiniband and Server Net and those networks that may become available as computer technology develops in the future. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on exemplary use of a simple data network having several example hosts and I/O units including I/O controllers that are linked together by an interconnection fabric, although the scope of the present invention is not limited thereto.

Figure 1:
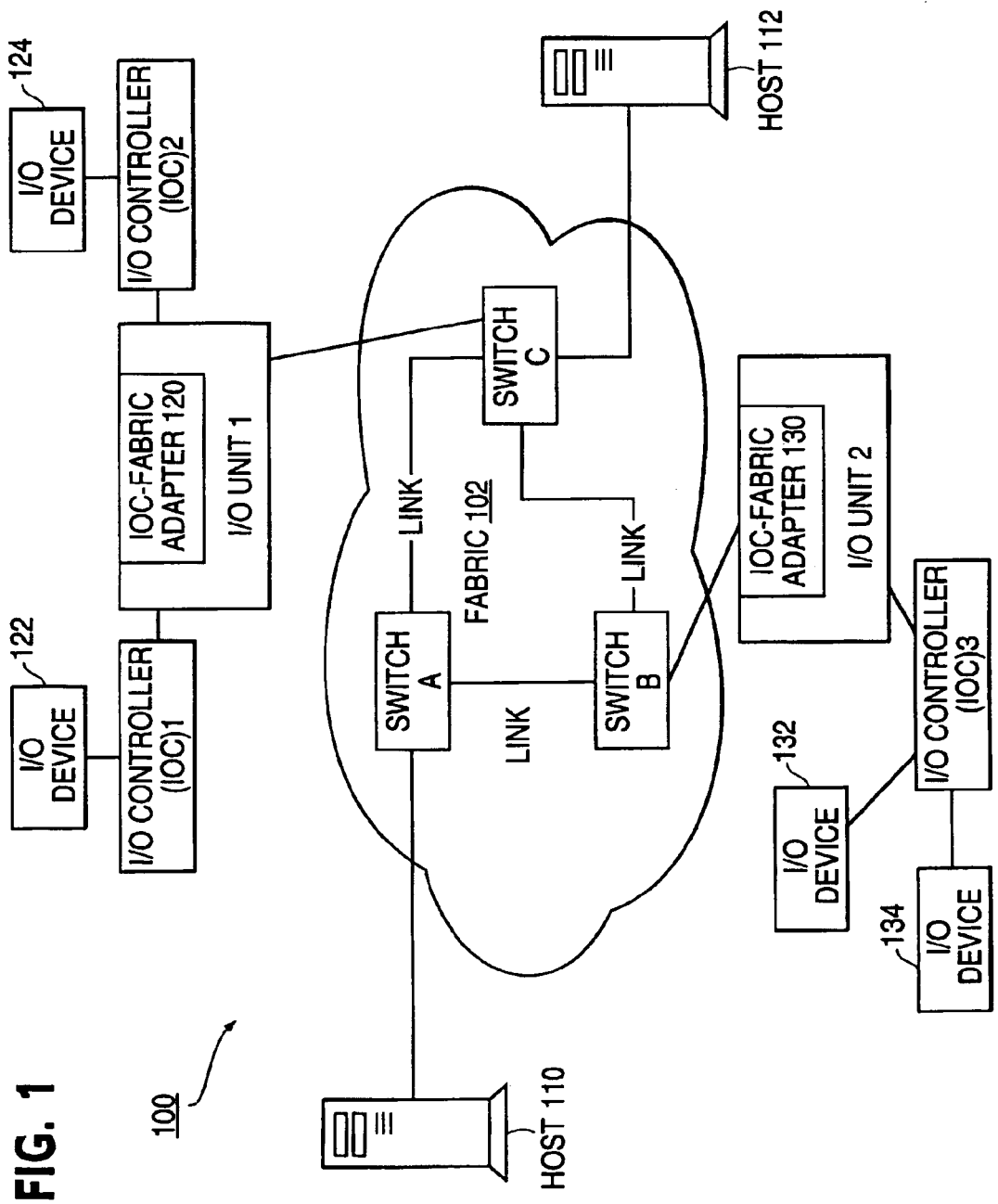
FIG. 1 illustrates a data network according to an example embodiment of the present invention.

Attention now is directed to the drawings and particularly to FIG. 1 where an example data network having several interconnected endpoints (nodes) for data communications is illustrated. As shown in FIG. 1, the data network 100 may include, for example, an interconnection fabric (hereinafter referred to as "switched fabric") 102 of one or more switches A, B and C and corresponding physical links, and several endpoints (nodes) that may correspond to one or more I/O units 1 and 2, computers and servers such as, for example, host 110 and host 112 I/O unit 1 may include one or more controllers connected thereto, including I/O controller 1 (IOC1) and I/O controller 2 (IOC2). Likewise, I/O unit 2 may include an I/O controller 3 (IOC3) coupled thereto. Each I/O controller 1, 2 and 3 (IOC1, IOC2 and IOC3) may operate to control one or more I/O devices. For example, I/O controller 1 (IOC1) of the I/O unit 1 may be coupled to I/O device 122, while I/O controller 2 (IOC2) may be coupled to I/O device 124. Similarly, I/O controller 3 (IOC3) of the I/O unit 2 may be coupled to I/O devices 132 and 134. The I/O devices may be any of several types of I/O devices such as storage devices (e.g., a hard disk drive, tape drive) or other I/O devices.

The hosts and I/O units including attached I/O controllers and I/O devices may be organized into groups known as clusters with each cluster including one or more hosts and typically one or more I/O units (each I/O unit including one or more I/O controllers). The hosts and I/O units may be interconnected via a switched fabric 102, which is a collection of switches A, B and C and corresponding physical links connected between the switches A, B and C.

In addition, each I/O unit includes one or more I/O controller-fabric (IOC-fabric) adapters for interfacing between the switched fabric 102 and the I/O controllers (e.g., IOC1, IOC2 and IOC3). For example, the IOC-fabric adapter 120 may interface the I/O controllers 1 and 2 (IOC1 and IOC2) of the I/O unit 1 to the switched fabric 102, while the IOC-fabric adapter 130 may interface the I/O controller 3 (IOC3) of the I/O unit 2 to the switched fabric 102.

The specific number and arrangement of hosts, I/O units, I/O controllers, I/O devices, switches and links shown in FIG. 1 are provided simply as an example data network. A wide variety of implementations and arrangements of any number of hosts, I/O units, I/O controllers, I/O devices, switches and links in all types of data networks may also be possible.

Figure 2:
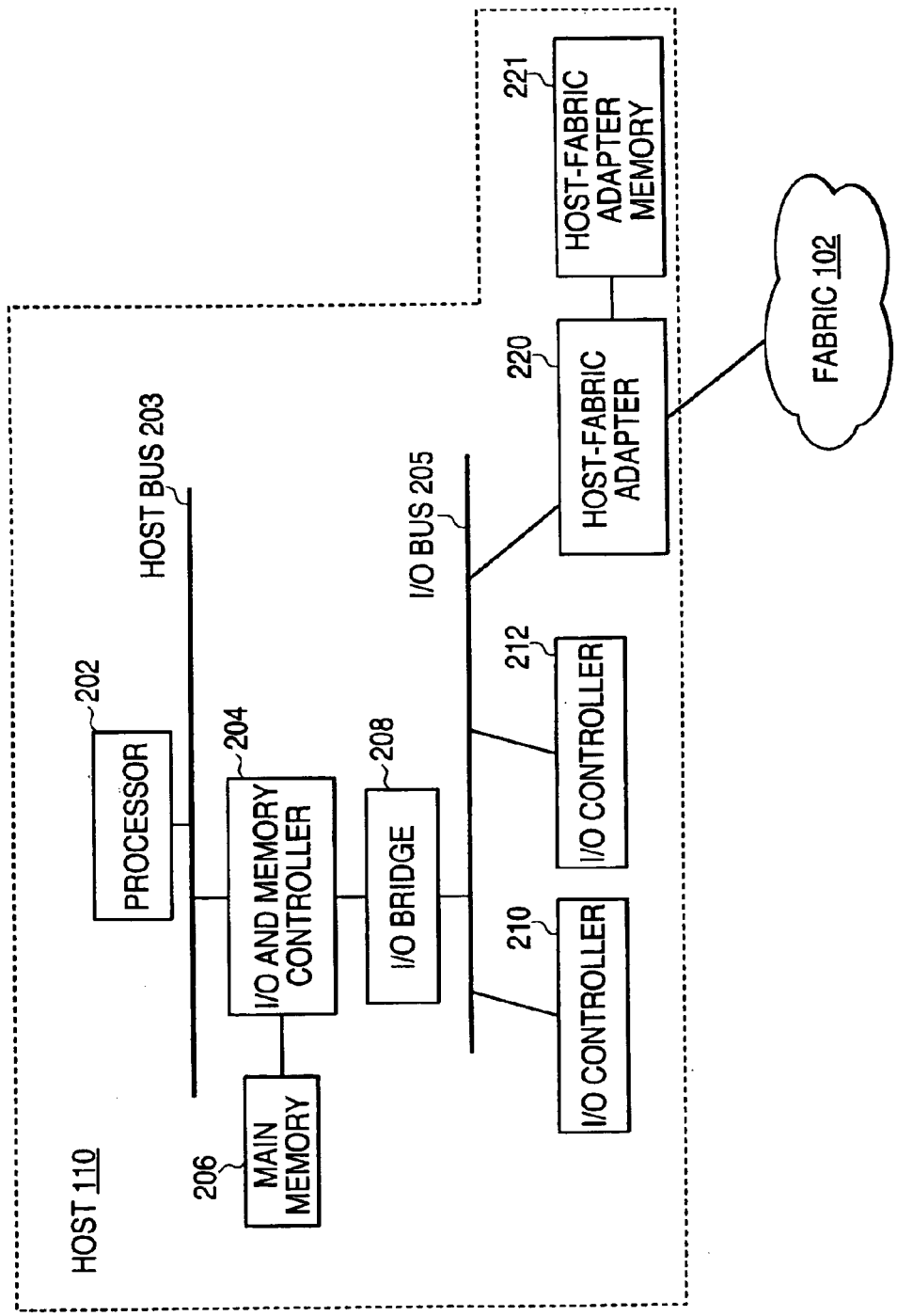
FIG. 2 illustrates a block diagram of a host of a data network according to an example embodiment of the present invention.

An example embodiment of a host (e.g., host 110 or host 112) may be shown in FIG. 2. Referring to FIG. 2, the host 110 may include a processor 202 coupled to a host bus 203. An I/O and memory controller 204 (or chipset) may be coupled to the host bus 203. A main memory 206 may be coupled to the I/O and memory controller 204. An I/O bridge 208 may operate to bridge or interface between the I/O and memory controller 204 and an I/O bus 205. Several I/O controllers may be coupled to I/O bus 205, including I/O controllers 210 and 212. I/O controllers 210 and 212 (including any I/O devices coupled thereto) may provide bus-based I/O resources.

One or more host-fabric adapters 220 may also be coupled to the I/O bus 205. Alternatively, the host-fabric adapter 220 may be coupled directly to the I/O and memory controller (or chipset) 204 to avoid any limitations of the I/O bus 205 (see FIG. 3). In either situation, the host-fabric adapter 220 may be considered to be a type of a network interface card (e.g., an NIC that usually includes hardware and firmware) for interfacing the host 110 to the switched fabric 102. The host-fabric adapter 220 may be utilized to provide fabric communication capabilities for the host 110. For example, the host-fabric adapter 220 may convert data between a host format and a format that is compatible with the switched fabric 102. For data sent from the host 110, the host-fabric adapter 220 may format the data into one or more packets containing a sequence of one or more cells including header information and data information.

According to one example embodiment or implementation, the hosts or I/O units of the data network of the present invention may be compatible with an Infiniband architecture. Infiniband information/specifications are presently under development and will be published by the Infiniband Trade Association (formed Aug. 27, 1999) having the Internet address of http://www.Infinibandta.org. The hosts of I/O units of the data network may also be compatible with the "*Next Generation Input/Output (NGIO) Specification*" as set forth by the NGIO Forum on Mar. 26, 1999. The host-fabric adapter 220 may be a Host Channel Adapter (HCA), and the IOC-fabric adapters may be Target Channel Adapters (TCA). The host channel adapter (HCA) may be used to provide an interface between the host 110 or 112 and the switched fabric 102 via high speed serial links. Similarly, target channel adapters (TCA) may be used to provide an interface between the switched fabric 102 and the I/O controller of either an I/O unit 1 or 2, or another network, including, but not limited to, local area network (LAN), wide area network (WAN), Ethernet, ATM and fibre channel network, via high speed serial links. Both the host channel adapter (HCA) and the target channel adapter (TCA) may be implemented in the Infiniband architecture or in compliance with "*Next Generation I/O Architecture: Host Channel Adapter Software Specification, Revision* 1.0" as set forth by Intel Corp., on May 13, 1999. In addition, each host may contain one or more host-fabric adapters (e.g., HCAs). However, Infiniband and NGIO are merely example embodiments or implementations of the present invention, and the invention is not limited thereto. Rather, the present invention may be applicable to a wide variety of data networks, hosts and I/O controllers.

Figure 3:
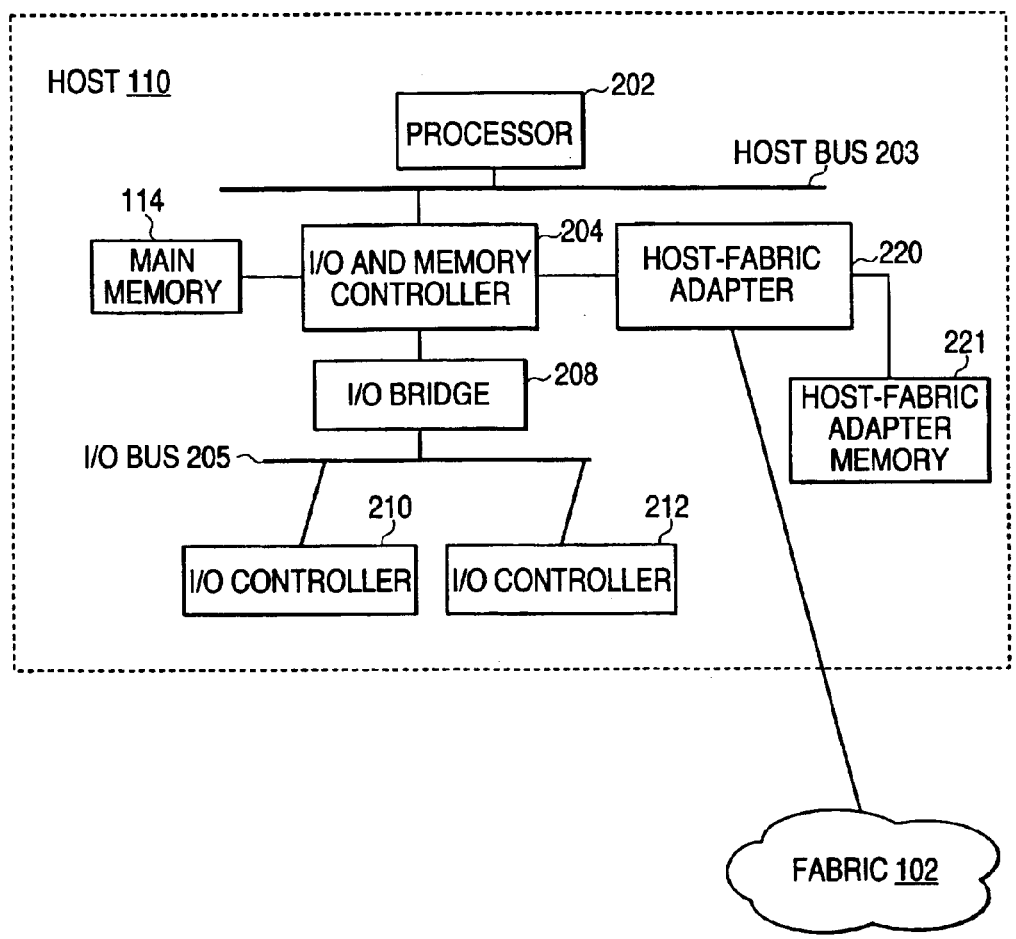
FIG. 3 illustrates a block diagram of a host of a data network according to another example embodiment of the present invention.

As described with reference to FIGS. 2–3, the I/O units and respective I/O controllers may be coupled directly to the switched fabric 102 rather than as part of a host 110. For example, I/O unit 1 including I/O controllers 1 and 2 (IOC1 and IOC2) and I/O unit 2 including an I/O controller 3 (IOC3) may be directly (or independently) coupled to the switched fabric 102. In other words, the I/O units (and their connected I/O controllers and I/O devices) are attached as separate and independent I/O resources to the switched fabric 102 as shown in FIGS. 1–3, as opposed to being part of the host 110. As a result, I/O units including I/O controllers (and I/O devices) coupled to the switched fabric 102 may be flexibly assigned to one or more hosts (rather than having a predetermined or fixed host assignment based upon being physically coupled to the host's local I/O bus). The I/O units, I/O controllers and I/O devices that are attached to the switched fabric 102 may be referred to as fabric-attached I/O resources (i.e., fabric-attached I/O units, fabric-attached I/O controllers and fabric-attached I/O devices) because these components are directly attached to the switched fabric 102 rather than being connected as part of a host.

In addition, the host 110 may detect and then directly address and exchange data with I/O units and I/O controllers (and attached I/O devices) that are directly attached to the switched fabric 102 (i.e., the fabric-attached I/O controllers) via the host-fabric adapter 220. A software driver stack for the host-fabric adapter 220 may be provided to allow the host 110 to exchange data with remote I/O controllers and I/O devices via the switched fabric 102, while preferably being compatible with many currently available operating systems such as Windows 2000.

Figure 4:
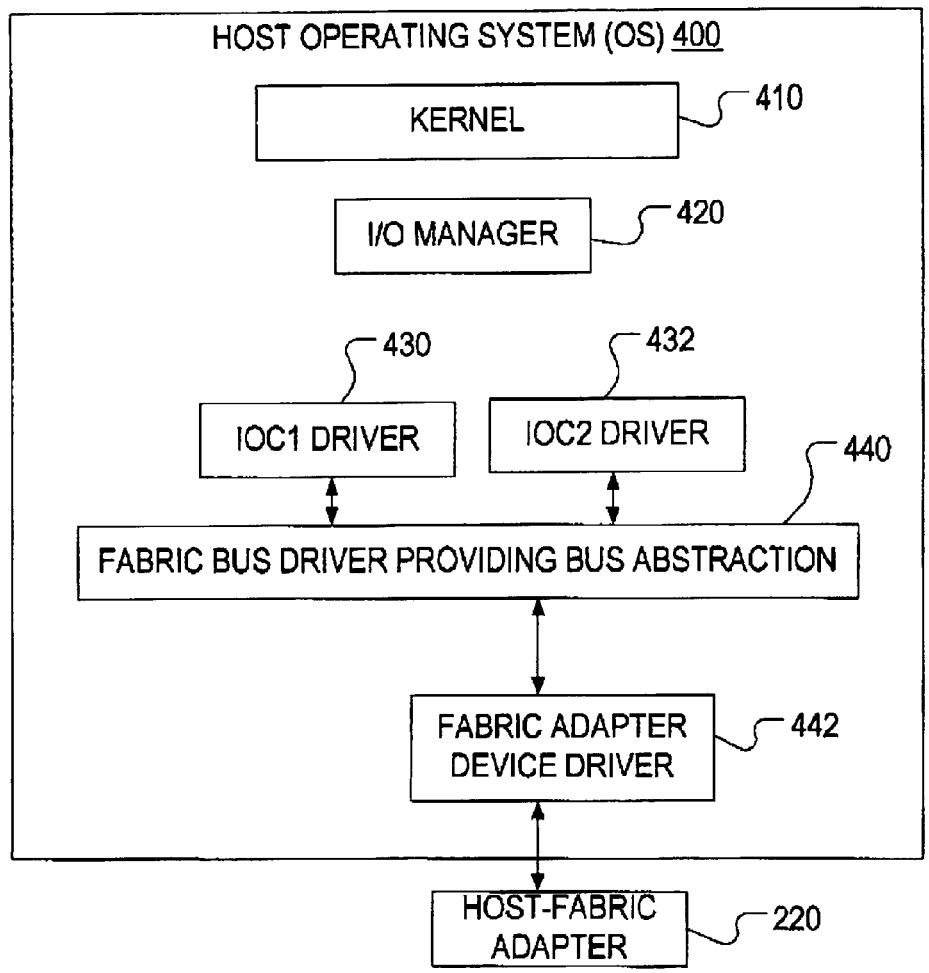
FIG. 4 illustrates an example software driver stack of a host of a data network according to an example embodiment of the present invention.

FIG. 4 illustrates an example software driver stack of the host 110 having fabric-attached I/O resources according to an example embodiment of the present invention. As shown in FIG. 4, the host operating system (OS) 400 includes a kernel 410, an I/O manager 420, and a plurality of I/O controller drivers for interfacing to various I/O controllers, including I/O controller drivers 430 and 432. According to an example embodiment, the host operating system (OS) 400 may be Windows 2000, and the I/O manager 420 may be a Plug-n-Play manager.

In addition, a fabric adapter driver software module may be provided to access the switched fabric 102 and information about fabric configuration, fabric topology and connection information. Such a driver software module may include a fabric bus driver (upper driver) 440 and a fabric adapter device driver (lower driver) 442 utilized to establish communication with a target fabric-attached agent (e.g., I/O controller), and perform functions common to most drivers, including, for example, channel abstraction, send/receive 10 transaction messages, remote direct memory access (RDMA) transactions (e.g., read and write operations), queue management, memory registration, descriptor management, message flow control, and transient error handling and recovery. Such software module may be provided on a tangible medium, such as a floppy disk or compact disk (CD) ROM, or via Internet downloads, which may be available for plug-in or download into the host operating system (OS) or any other viable method.

The host 110 may communicate with I/O units and I/O controllers (and attached I/O devices) that are directly attached to the switched fabric 102 (i.e., the fabric-attached I/O controllers) using a Virtual Interface (VI) architecture. Under the "*Virtual Interface (VI) Architecture Specification, Version* 1.0," as set forth by Compaq Corp., Intel Corp., and Microsoft Corp., on Dec. 16, 1997, the VI architecture may include four basic components: virtual interface (VI) of pairs of works queues (send queue and receive queue), VI consumer which may be an application program, VI provider which may be hardware and software components responsible for instantiating VI, and completion queue (CQ). VI is the mechanism that allows VI consumers to directly access a VI provider. Each VI represents a communication endpoint, and endpoint pairs may be logically connected to support bi-directional, point-to-point data transfer. Under the VI architecture, the host-fabric adapter 220 and VI kernel agent may constitute the VI provider to perform endpoint virtualization directly and subsume the tasks of multiplexing, de-multiplexing, and data transfer scheduling normally performed by the host operating system (OS) kernel 410 and device driver 442 as shown in FIG. 4.

Figure 5:
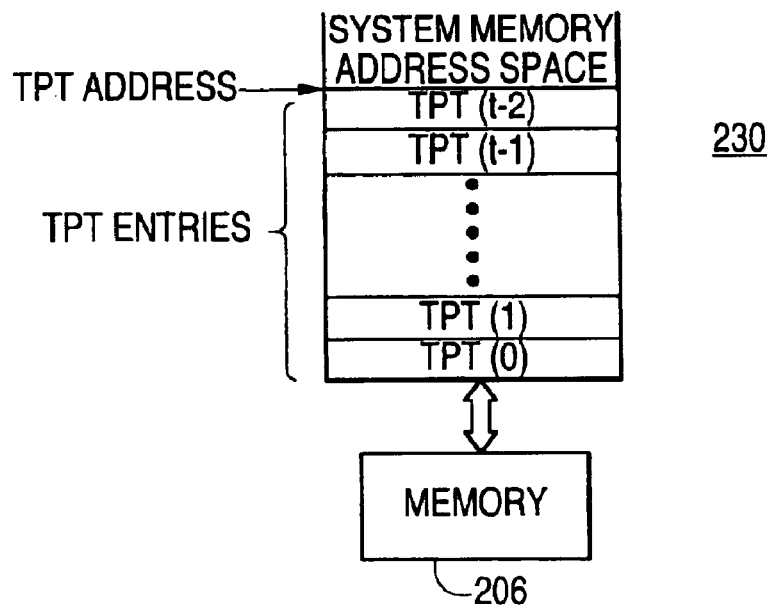
FIG. 5 illustrates an example translation and protection table.

The translation and protection table (TPT) 230 shown in FIG. 5 may be used to translate virtual addresses, received in a form of packet descriptors on queue pairs (e.g., a data structure that describes a request to move data), into physical addresses and to define memory regions of the host memory 206 that may be accessed by the host-fabric adapter 220 (i.e., validate access to host memory). In addition, the translation and protection table (TPT) 230 may also be used to validate access permission rights of the host-fabric adapter 220 and to perform address translation before accessing any other memory in the host 110. The translation and protection table (TPT) 230 may contain a plurality of TPT entries, for example, TPT(0), TPT(1) ... TPT(t−1) and TPT(t−2), in the system memory address space. Each TPT entry (hereafter also called a translation entry) may represent a single page of the host memory 206, such as 4 KB of physically contiguous host memory 206. As will be described below, the TPT table 230 may also include region entries that have more than one level of entries. Accordingly, the TPT table 230 may include translation entries and region entries. Each region entry may contain multiple levels of translation entries. The TPT table 230 may be stored within the host memory 206 or it may be stored in a different memory area of the host 110 or of the host-fabric adapter 220 or memory 221 associated with the host-fabric adapter.

Figure 6:
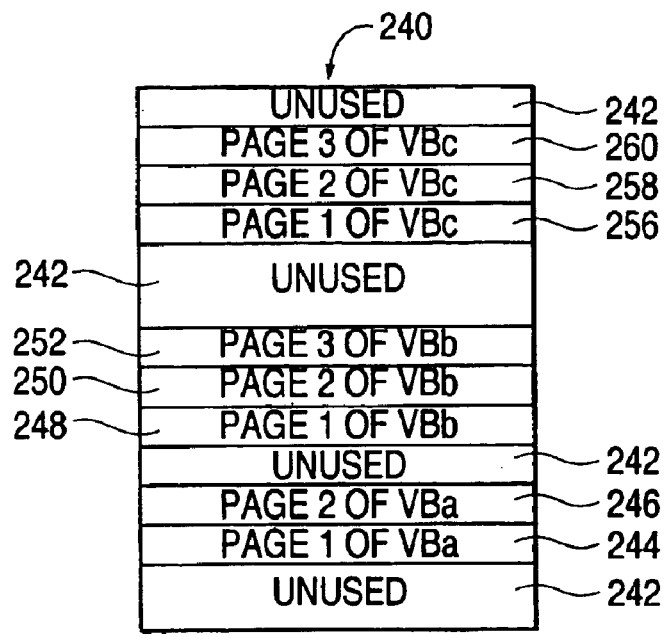
FIG. 6 illustrates an example translation and protection table.

FIG. 6 illustrates another translation and protection table (TPT) 240 that may be used to translate virtual addresses into physical addresses. As discussed above, the TPT 240 may validate access permission rights of the host-fabric adapter 220 and perform address translation before accessing any other memory in the host 110. Each TPT 240 may contain a plurality of entries that are associated with virtual buffers. For the example shown in FIG. 6, three virtual buffers may be associated with the TPT 240, namely virtual buffer A(VBa), virtual buffer B(VBb) and virtual buffer C(VBc). Each translation entry may correspond to one page of a virtual buffer such as 4 KB or 4 MB of data. Other amounts of data are also within the scope of the present invention. For this example in which each entry corresponds to 4 KB of data, virtual buffer A includes 8 KB of data, virtual buffer B includes 12 KB of data and virtual buffer C includes 12 KB of data. More specifically, the TPT 240 includes entries 244 and 246 for the addresses of page 1 and page 2 of virtual buffer A, respectively. The TPT 240 also includes entries 248, 250 and 252 for the addresses of page 1, page 2 and page 3 of virtual buffer B, respectively. The TPT 240 further includes entries 256, 258 and 260 for the addresses of page 1, page 2 and page 3 of virtual buffer C, respectively. The TPT 240 may also include unused portions 242 that separate the pages of the different virtual buffers. That is, the unused portion 242 may separate the pages of virtual buffer A from the pages of virtual buffer B and similarly the unused portion 242 may separate the pages of virtual buffer B from the pages of virtual buffer C. The unused portions 242 may also be provided at the beginning and end of the TPT 240.

Figure 7:
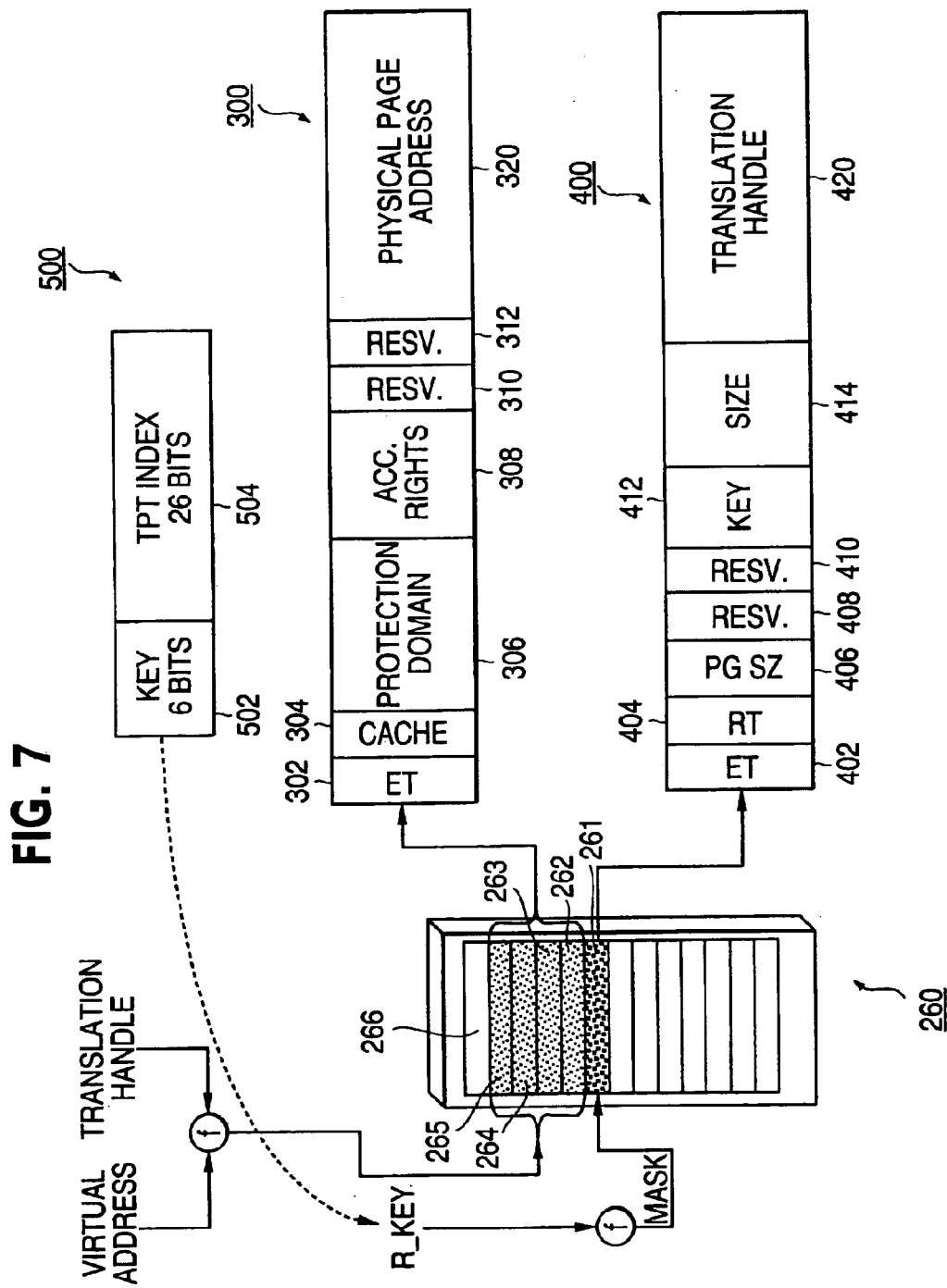
FIG. 7 illustrates a translation and protection table as well as translation entries and a region entry according to an example embodiment of the present invention.

FIG. 7 shows another translation and protection table (TPT) 260 according to an example embodiment of the present invention. FIG. 7 also shows a translation entry 300, a region entry 400 and a key entry 500 that will be described below. This TPT table 260 includes two types of tables imbedded within a single TPT table. The two types of tables correspond with two types of entries (i.e., translation entries and region entries). The two types of entries may be distinguished by an entry type bit as will be described below. Region entries may be called (or classified as) local region entries or bindable region entries. The collection of a local or bindable region entry and one or more translation entries describes a memory region that has been registered. At least one translation entry follows a region entry in the TPT table 260. For example, the entry 261 may be a region entry similar to the region entry 400. Because each region entry is followed by at least one translation entry, then at least the entry 262 is within the region (or table) defined by the region entry 261. The entries 263, 284 and 285 may also be within the region (or table) defined by the region entry 261. Each region entry may correspond to a specific region within the TPT table 260 as compared with a single entry for each translation entry. The TPT table 260, the key entry 500, the translation entry 300 and the region entry 400 represent one example embodiment of the pres nt invention as other embodiments, configurations, and arrangements are also within the scope of the present invention.

The translation entry 300 may include the following fields: a one bit entry type field 302, a one bit cache field 304, a sixteen bit protection domain field 306, a three bit access rights field 308, a one bit reserved field 310, a one bit reserved field 312 and a 41 bit physical page address field 320. Other configurations and numbers of bits for each of the respective fields in the translation entry 300 are also within the scope of the present invention. The translation entry 300 may also have more fields or less fields than that shown in FIG. 7.

The region entry 400 may include the following fields: a one bit entry type field 402, a two bit region type field 404, a one bit page size field 406, a one bit reserved field 408, a one bit reserved field 410, a six bit key field 412, a 20 bit size field 414 and a 32 bit translation handle field 420. Other configurations and numbers of bits for each of the respective fields in the region entry 400 are also within the scope of the present invention. The region entry 400 may also have more fields or less fields than that shown in FIG. 7.

The key entry 500 may include a six bit key field 502 and a 26 bit TPT index field 504. The key entry 500 may be called (or classified as) an R-key for remote access. Alternatively, the key entry 500 may also be called (or classified as) an L-key for local access. In operation, the six bits of the key field 502 may be compared against the six bits of the key field 412 in a region entry 400 (or a key field 622 in a subsequently described window entry 610) to verify access rights as will be described below. The TPT index field 504 may be used to reference one of the region entries or one of the translation entries (based on its index number). Other configurations and numbers of bits for each of the respective fields in the key entry 500 are also within the scope of the present invention. The key entry 500 may also have more fields or less fields than that shown in FIG. 7.

The different fields of the translation entry 300, the region entry 400 and the key entry 500 will now be described. In the translation entry 300, the bit of the entry type field 302 (and similarly the bit of the entry type field 402 in the region entry 400 and the bit of an entry type field 612 of a window region entry 600) may distinguish between: (a) whether an entry is a translation entry (such as the translation entry 300); or (b) whether the entry is a region entry (such as the region entry 400 or the window region entry 600). For example, if the bit is a 0, then the entry may be a translation entry. On the other hand, if the bit is a 1, then the entry may be a region entry. This bit helps provide the two-level table having translation entries and region entries. The bit of the cache field 304 may be used to determine cache attributes. The bits of the protection domain field 306 may be used to determine access permission. The bits of the access rights field 308 may be used to determine the operations that are allowed. Finally, the bits of the physical page address field 320 may be used to define the upward physical address bits associated with the physical page represented by the translation entry 300.

In the region entry 400, the bit of the entry type field 402 may distinguish between: (a) whether an entry is a translation entry (such as the translation entry 300); or (b) whether the entry is a region entry (such as the region entry 400 or the window region entry 600). The two bits of region type field 404 may be used to distinguish between different types of regions. For example, the two bits of the region type field 404 may distinguish between a local region (bits 00), a bindable region (bits 01), a window region (bits 10), and a window extension region (bits 11). The terminology local region and bindable region for a local region describe a memory region and remote access rights associated with that memory region. For example, a local region is a region in which the system may not open a memory window onto that particular region and a bindable region is a region in which the system may open a memory region onto that particular region. In other words, if a region is bindable, then a memory window may be opened onto that region. The bit of the page size field 406 may be used to distinguish between different sizes of translation entries (i.e., page sizes) such as a 4 KB page size or a 4 MB page size. This may be used to determine the number of translation entries that follow. The bits of the key field 412 may used to validate the key entry 500 (L-key or R-key) that indexes this respective entry. The bits of the size field 414 may determine the bounds of the region in terms of translation entries 300. Finally, the bits of the translation handle field 420 may be used with the virtual address to determine which translation entry holds the page information.

FIG. 8 shows another translation and protection table (TPT) 270 according to an example embodiment of the present invention. FIG. 8 also shows the translation entry 300, the region entry 400 and a window region entry 600. The TPT table 270 and the window region entry 600 represents an example embodiment of the present invention as other embodiments, configurations and arrangements are also within the scope of the present invention.

The window region entry 600 will now be described. A full window region entry may include a region of type window followed by two regions of type window extension (i.e., three TPT slots are provided per memory window). The two window extensions sequentially follow (i.e., in a TPT index) the window entry in the TPT table 270. For example, the window region entry 600 may include a window entry 610 followed by a window extension entry 630 and a window extension entry 640. The window entry may define the permissions, access rights and locations of the underlying local region for the window. A memory window may be a range of addresses that can be accessed from a remote entity.

The window entry 610 may include the following fields: a one bit entry type field 612, a two bit region type field 614, a three bit access rights field 616, a one bit bound field 618, a one bit page size field 620, a six bit key field 622, a sixteen bit protection domain field 624 and a 32 bit key field 626. In a similar manner as described above with respect to the region entry 400, the bit of the entry type field 612 may distinguish between translation entries and region entries and the two bits of the region type field 614 may distinguish between the different types of region entries, such as local, bindable, window or window extension. The bits of the access rights field 616 may be used to distinguish the types of remote operations that are allowed, such as remote read access, remote write access, and remote atomic access (i.e., read modify write). The bit of the bound field 618 may be used to distinguish whether the window is bound or unbound. For example, a 0 bit may correspond to an unbound window and a 1 bit may correspond to a bound window. The bit of the page size field 620 may be used to distinguish between different sizes of translation entries (i.e., page sizes) such as a 4 KB page size or a 4 MB page size. The bits of the key field 622 may be used to validate the key entry 500 that indexes this respective entry. That is, the six bits of the key field 622 may be compared against the six bits of the key field 502 to verify access rights. The bits of the protection domain field 624 may be used to validate access permission while the bits of the key field 626 may be used to hold an L-key as described by key entry 500 and may be used to point to a local region upon which this window is based (i.e., associates the window with an underlying region). Other configurations and number of bits for each of the respective fields in the window entry 610 are also within the scope of the present invention. The window entry 610 may also have more fields or less fields than that shown in FIG. 8.

As described above, the window extension entry 630 and the window extension entry 640 are a type of region that may be identified in the region type field 614. The window extension entries 630 and 640 may help define the byte level starting address of the mapped region and the length of that region (in bytes). The window extension entry 630 may include the following fields: a one bit entry type field 632, a two bit region type field 634, a 24 bit length field 636 and a 32 bit base address field 638. Similarly, the window extension entry 640 may include the following fields: a one bit entry type field 642, a two bit region type field 644, a 24 bit length field 646 and a 32 bit base address field 648. The entry type fields 632 and 642 and the region type fields 634 and 644 of the window entry 600 may be similar to the entry type fields 302 and 402 and the region type field 404 discussed above. Other configurations and numbers of bits for each of the respective fields in the window extension entries 630 and 640 are also within the scope of the present invention. The window extension entries 630 and 640 may also have more fields or less fields than that shown in FIG. 8.

A base address of the window region may be obtained by successively combining the bits of the base address fields 638 and 648. A length of the window may be obtained by successively combining the bits of length fields 636 and 646. More specifically, in order to obtain a length (48 bits) of the window region, the lower 24 bits (of the 48 bit length) may be provided from the length field 636 while the upper 24 bits (of the 48 bit length) may be provided from the length field 646. Further, in order to obtain a base address (64 bits) of the window, the lower 32 bits (of the 64 bits) may be provided from the base address field 638 while the upper 32 bits (of the 64 bit length) may be provided from the base address 648. The virtual address and the length (in bytes) may define the virtual bounds of the memory region.

Embodiments of the present invention may provide a memory window feature that allows remote access rights to selected portions of the existing registered memory region.

This may be referred to as binding a window. Stated differently, the region entry 400 may correspond to a specific region within the TPT table. For example, the TPT table 260 may include different entries 261, 262, 263, 264, 265 and 285. The region entry 400 may correspond to the entry 261. Each of the entries 202–265 may correspond to a specific translation entry 300 which may be a part of the region. The bit of the entry type field 402 may distinguish between the different types of entries (i.e., a translation entry or a region entry). Further, a remote entity may be given remote access rights to write (or modify) to a specific area within a region entry, such as 100 bytes of a region entry, by using a window region entry (i.e., from a memory window). The base address and the lengths in the window extension entries would identify the 100 bytes of the region entry.

As discussed above, the key entry 500 may be an R-key or an L-key that is divided into a key field 502 and a TPT index field 504. The key field 502 may provide a unique key value so as to distinguish different generations. The key field 502 may define the current generation of the region entry and may be changed each time the contents of the region entry 400 are modified. The index field 504 may point to a specific region entry in the TPT table 260. The region entry may define the bounds and attributes of a mapped region of memory.

Operations to perform a remote translation lookup will now be described. Other embodiments are also within the scope of the present invention. Each remote operation request may supply a virtual address (VA), an R-key (i.e., a key entry 500) and a length. The R-key may be used to locate a region entry 400 by using the index field 504. The bits of the key field 502 within the key entry 500 may be checked against the bits of the key field 412 in the region entry 400. Assuming that the verification is successful, the bits of the region type field 404 may determine if the region is a local region, a bindable region, a window region or a window extension region. Depending on the type of region, different operations may occur as will now be described.

If the region is a window region, then the virtual address (VA) and the length may be checked against the window address bounds. The remote access rights may also be checked using the bits of the remote access rights field 616 in the window entry 610. The bits of the key field 626 may be used to locate the memory region that backs this window. This may be done by checking that the region type is bindable, checking the key, checking the virtual address and length against the region bounds and using the translation handle and the virtual address to locate a translation entry. Upon locating the translation entry 300, the bit of the entry type field 302 may be checked to determine the entry is a translation entry, the bits of the protection domain field 306 may be checked and the physical page address may be determined from the physical page address field 320.

On the other hand, if region type is determined to be bindable or local, then the following operations may be performed. The translation handle, virtual address (VA) and the length may be checked against the TPT bounds. The translation handle, the page size and the virtual address may be used to locate a translation entry. Upon locating the translation entry 300, the bit of the entry type field 302 may be checked to determine the entry is a translation entry, the bits of the protection domain field 306 may be checked, the remote access rights may be checked from the access rights field 308, and the physical page address may be determined from the physical page address field 320.

Operations to perform a local translation will now be described. Other operations are also within the scope of the present invention. Each local operation may specify a number (zero or more) of data segments with each segment providing a virtual address (VA), an L-key (i.e., a key entry 500) and a length. The L-key may be used to locate a region entry 400. The region type may then be verified to be either bindable or local based on the bits of the region type field 404. The bits of the key field 502 within the key entry 500 may be checked against the bits of the key field 412 in the region entry 400. The virtual address and length may then be checked against the region's bounds. Bits of the translation handle field 420, the page size field 414 and the virtual address may be used to locate a translation entry. Upon locating the translation entry 300, the bit of the entry type field 302 may be checked to determine the entry is a translation entry, the bits of the protection domain field 306 may be checked, the local access rights may be checked from the access rights field 308, and the physical page address may be determined from the physical page address field 320.

Address bounds checking may also be performed for window regions. As described above, the base address and window length of the window region may be determined from the base address fields 638 and 648 and the length fields 636 and 646 from the two translation entries (i.e., window extension entries) immediately following the window entry 610. Each of the window extension entries 630 and 640 may have an entry type of type "Region" (in the entry type field 612) and a region type of type "Window Extension" (in the region type field 614).

The received virtual address is equal to or greater than the base address (i.e., a combination of the base address fields 638 and 648) and the virtual address is less than the base address plus the window length (i.e., a combination of the length fields 636 and 646). Additionally, the received virtual address plus the given window length is less than the base address plus the window length. The window length is also greater than zero.

Address bounds checking may also be performed for local regions as will now be described. The addresses may be checked to the translation entry level. The number of valid translation entries for a particular region may be extracted from the region entry 400. The received virtual address when combined with the handle (in the handle field 420) translates to a TPT index number. The TPT index may have a range from the region entry's index plus one through the region entry's index plus one plus the size (from the size field 414). For lengths other than zero, the given virtual address plus length (i.e., from the combination of the length fields 636 and 646) minus 1, when combined with the translation handle translates to a TPT index number. As previously indicated, the TPT index has a range from the region entry's index plus one through the region entry's index plus one plus the size (from the page size field 414).

While there have been illustrated and described what are considered to be example embodiments of the present invention, it will be understood by those skilled in the art and as technology develops that various changes and modifications may be made, and equivalents may be substituted for elements thereof without departing from the scope of the present invention. The present invention may be applicable to all types of redundant type networks, including, but not limited to, Infiniband, Next Generation Input/Output (NGIO), ATM, SAN (system area network, or storage area network), server net, Future Input/Output (FIO), fiber channel, and Ethernet. In addition, processes described above may be performed by a computer processor executing instructions organized into a program module or a custom designed state machine. Storage devices suitable for tangibly embodying computer program instructions include all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks. It is intended that the present invention is not limited to the various disclosed embodiments. Rather, various other modifications and changes may occur to those skilled in the art without departing from the spirit and scope of the present invention.

What is claimed is:

1. A method comprising:
   in response to receiving a memory access request comprising a virtual address and a key entry, locating a region in a translation and protection table (TPT), the region being associated with a region entry;
   validating access to the region by comparing a first key field to a second key field, the first key field associated with the key entry, and the second key field associated with the region entry; and
   if access to the region is validated, responding to the memory access request in accordance with a region type field of the region entry.

2. The method of claim 1, wherein said locating a region in the TPT is based on an index field of the key entry.

3. The method of claim 1, wherein access to the region is validated if the first key field matches the second key field.

4. The method of claim 1, wherein the region type field of the region entry comprises a window region associated with a window, and wherein said responding to the memory access request comprises:
   determining if an access type associated with the memory access request is allowed;
   if the access type is allowed, locating a translation entry corresponding to the memory access request based on the virtual address and a translation handle associated with the region entry;
   validating access to the translation entry; and
   determining a physical page address corresponding to the virtual address based on the translation entry.

5. The method of claim 4, wherein said determining if an access type associated with the memory access request is allowed comprises checking a remote access rights field of the region entry.

6. The method of claim 1, wherein the region type field of the region entry comprises one of a local region and a bindable region, and wherein said responding to the memory access request comprises:
   locating a translation entry associated with the memory access request based on the virtual address, a translation handle associated with the region entry and page size associated with the region entry;
   validating access to the translation entry; and
   determining a physical page address corresponding to the virtual address based on the translation entry.

7. A method comprising:
   in response to receiving a memory access request comprising a virtual address, locating a region in a translation and protection table (TPT) associated with the memory access request, the region being associated with a region entry, and corresponding to one or more translation entries each corresponding to a physical address;
   validating access to the region at a region level, and to one of the one or more translation entries at a translation entry level, the one translation entry corresponding to the memory access request; and
   if access to the region and translation entry is validated, determining a physical address corresponding to the virtual address.

8. The method of claim 7, wherein the memory access request comprises a key entry, and wherein locating the region in the TPT comprises locating the region in the TPT based on an index field of the key entry.

9. The method of claim 8, wherein said validating access to the region comprises comparing a first key field to a second key field, the first key field associated with the key entry, and the second key field associated with the region entry.

10. The method of claim 7, wherein said validating access to the translation entry corresponding to the memory access request comprises checking a protection domain field of the translation entry.

11. The method of claim 7, wherein said determining a physical address corresponding to the one translation entry comprises:
    using the virtual address, and a translation handle of the region entry to locate a translation entry; and
    accessing the physical address from the determined translation entry.

12. The method of claim 7, additionally comprising verifying if an access type associated with the memory access request is allowed at the region level, and at the translation level.

13. The method of claim 12, wherein said verifying if an access type associated with the memory access request is allowed at the region level comprises checking a remote access rights field of the region entry.

14. The method of claim 12, wherein said verifying if an access type associated with the memory access request is allowed at the translation entry level comprises checking an access rights field of the translation entry.

15. An apparatus comprising:
    a network interface card (NIC) to:
    in response to receiving a memory access request comprising a virtual address, locate a region in a translation and protection table (TPT) associated with the memory access request, the region being associated with a region entry, and corresponding to one or more translation entries each corresponding to a physical address;
    validate access to the region at a region level, and to one of the one or more translation entries at a translation entry level, the one translation entry corresponding to the memory access request; and
    if access to the region and translation entry is validated, determine a physical address corresponding to the virtual address.

16. The apparatus of claim 15, wherein the memory access request comprises a key entry, and wherein locating the region in the TPT comprises locating the region in the TPT based on an index field of the key entry.

17. The apparatus of claim 16, wherein said validating access to the region comprises comparing a first key field to a second key field, the first key field associated with the key entry, and the second key field associated with the region entry.

18. The apparatus of claim 15, wherein said validating access to the translation entry corresponding to the memory access request comprises checking a protection domain field of the translation entry.

19. The apparatus of claim 15, wherein the NIC determines a physical address corresponding to the one translation entry by:

using the virtual address, and a translation handle of the region entry to locate a translation entry; and accessing the physical address from the determined translation entry.

20. A system comprising:

a memory;

a memory controller coupled to the memory;

a network interface card (NIC) coupled to the memory controller to:

in response to receiving a memory access request comprising a virtual address, locate a region in a translation and protection table (TPT) associated with the memory access request, the region being associated with a region entry, and corresponding to one or more translation entries each corresponding to a physical address;

validate access to the region at a region level, and to one of the one or more translation entries at a translation entry level, the one translation entry corresponding to the memory access request; and if access to the region and translation entry is validated, determine a physical address corresponding to the virtual address.

21. The system of claim 20, wherein the memory access request comprises a key entry, and wherein locating the region in the TPT comprises locating the region in the TPT based on an index field of the key entry.

22. The system of claim 21, wherein said validating access to the region comprises comparing a first key field to a second key field, the first key field associated with the key entry, and the second key field associated with the region entry.

23. The system of claim 20, wherein said validating access to the translation entry corresponding to the memory access request comprises checking a protection domain field of the translation entry.

24. The system of claim 20, wherein the NIC determines a physical address corresponding to the one translation entry by:

using the virtual address, and a translation handle of the region entry to locate a translation entry; and accessing the physical address from the determined translation entry.

25. The system of claim 20, wherein the NIC comprises a host fabric adapter.

26. An article comprising a machine-readable medium having machine-accessible instructions, the instructions when executed by a machine, result in the following:

in response to receiving a memory access request comprising a virtual address, locating a region in a translation and protection table (TPT) associated with the memory access request, the region being associated with a region entry, and corresponding to one or more translation entries each corresponding to a physical address;

validating access to the region at a region level, and to one of the one or more translation entries at a translation entry level, the one translation entry corresponding to the memory access request: and if access to the region and translation entry is validated, determining a physical address corresponding to the virtual address.

27. The article of claim 26, wherein the memory access request compares a key entry, and wherein locating the region in the TPT comprises locating the region in the TPT based on an index field of the key entry.

28. The article of claim 27, wherein said validating access to the region comprises comparing a first key field to a second key field, the first key field associated with the key entry, and the second key field associated with the region entry.

29. The article of claim 26, wherein said validating access to the translation entry corresponding to the memory access request comprises checking a protection domain field of the translation entry.

30. The article of claim 26, wherein said determining a physical address corresponding to the one translation entry comprises:

using a virtual address, and a translation handle of the region entry to locate a translation entry; and accessing the physical address from the determined translation entry.

* * * * *